Oct. 13, 1936. W. H. RIPPERE 2,057,266
VENTILATED TUBULAR BUS BAR
Filed Jan. 27, 1934 3 Sheets-Sheet 1

INVENTOR
William H. Rippere
BY
Wooster & Davis
ATTORNEYS

Oct. 13, 1936.      W. H. RIPPERE      2,057,266
VENTILATED TUBULAR BUS BAR
Filed Jan. 27, 1934      3 Sheets-Sheet 2

INVENTOR
William H. Rippere
BY
Wooster & Davis
ATTORNEYS

Oct. 13, 1936.   W. H. RIPPERE   2,057,266
VENTILATED TUBULAR BUS BAR
Filed Jan. 27, 1934   3 Sheets-Sheet 3

INVENTOR
William H. Rippere
BY
Wooster & Davis
ATTORNEYS

Patented Oct. 13, 1936

2,057,266

UNITED STATES PATENT OFFICE 2,057,266

VENTILATED TUBULAR BUS BAR

William H. Rippere, Waterbury, Conn., assignor to The American Brass Company, Waterbury, Conn., a corporation of Connecticut Application January 27, 1934, Serial No. 708,600

9 Claims. (Cl. 173—13)

This invention relates to new and useful improvements in bus bars or similar conductors for electrical currents, and has particular relation to a ventilated tubular bus bar for carrying large currents, and has for an object to provide conductors for this purpose which may be composed of a single tubular section or of suitably shaped separate members which may be assembled to form a tubular section, and which sections provide a mechanically rigid bus bar or similar conductor for efficient transmission and distribution of heavy electric currents.

Another object of the invention is to provide a bus bar which is so constructed that it is thoroughly ventilated to prevent overheating by the circulation of air through it and which is, owing to such ventilation, capable of carrying heavier currents than may be carried by a bus bar containing the same amount of metal but which is not ventilated, and which will provide a conductor of hollow construction having desirable characteristics in that it will have high strength and rigidity compared with the area of cross section of the metal thus requiring a less number of supports, and will carry a maximum current for the amount of metal as the so called skin effect is reduced to a minimum.

A more specific object is to provide a bus bar comprising a one piece or an assembled metallic tube which is provided with holes, slots, perforations or the like for the circulation of air through the bar for the purpose of ventilating the same.

Another object is to provide an improved bus bar or conductor which can be easily mounted and with less complicated and costly supports than the old types of conductors, and which is of simple construction and may be manufactured by known metal working methods and with known metal working equipment.

Other objects and advantages will become apparent from a consideration of the following detailed description taken in connection with the accompanying drawings wherein satisfactory embodiments of the invention are shown. However, it will be understood that the invention is not limited to the details disclosed but includes all such variations and modifications as fall within the spirit of the invention and the scope of the appended claims.

Figure 1:
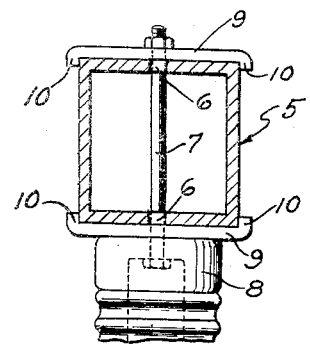
Fig. 1 is a transverse sectional view of a conductor constructed according to the present invention, means for mounting the conductor being shown in elevation.
Figure 2:
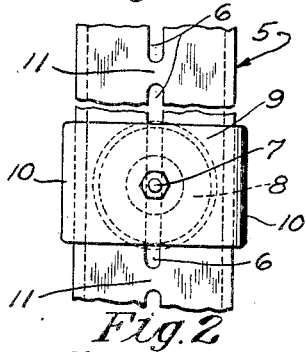
Fig. 2 is a top plan view of a portion of the conductor of Fig. 1.

Referring in detail to the drawings, and at first particularly to Figs. 1 and 2, the improved conductor or bus bar as there disclosed includes an integral elongated tubular body 5 which may be made up in sections of the desired length as will be understood, and which as disclosed is rectangular in transverse section. In its upper and lower walls tubular body 5 is provided with openings therein for ventilation and circulation of air, and in this case these openings comprise longitudinally extending slots 6, and the slots in one wall may or may not align with those in the other wall. Preferably the slots are formed in the walls approximately midway between the edges thereof. As these bus bars are used generally in a prone or substantially horizontal position it will be evident these openings permit ready circulation of air through the bar which keeps it much cooler than it would ordinarily be otherwise, thus greatly increasing its electrical efficiency and increasing the load for which a bar of any given size and cross section may be safely used, over the same bar without the ventilating openings. As the bar heats up somewhat due to heat generated by the electric current this in turn heats the air and increases its circulation through the bar and thus increases the cooling effect until a balance is reached.

The slots 6 in the upper and lower walls of the tube are not continuous throughout the entire length of the tube and may be formed in any suitable manner or by any suitable means. For example, the slots may be milled in the tube and their size may be determined more or less by the dimensions of the tube. An eight inch square tube may have slots approximately two feet long and ⅝ of an inch wide. Between the adjacent ends of the slots there should be left about one inch of solid metal as at 11 or sufficient to give the required strength, and the slots may be repeated at intervals to extend for the length of the tube, each slot being of the desired length and being separated from the next adjacent slot by a solid portion 11 of the tube as stated.

Of course, the slots need not be dimensioned as set forth above and it is not necessary that they be milled. It is also to be understood that the invention is not limited to any particular method or means for forming the slots since they might be milled, punched or the like, and the invention is not limited to openings of any particular shape, although elongated slots running longitudinally of the bar are preferred as they provide maximum circulation of air with minimum reduction of conductive cross section of the bar. As the slots may extend longitudinally in the middle of the top and bottom sides of the tube they provide for the free circulation of air through the tube and also provide openings for the passage of bolts 7 used for mounting the conductors on any suitable supports as for example of the type indicated at 8.

Various means may be used to mount the conductors, that shown in Figs. 1 and 2 comprising straps or brackets 9 disposed against the upper and lower sides of the conductor, and include inturned end portions 10 which engage the side walls of the conductor. Such brackets are clamped against the conductor by the bolt 7 and the bolt is used to secure the brackets and conductors to the support 8 as clearly shown in Fig. 1. Since the slots are elongated they provide means whereby the bolts may be shifted or adjusted lengthwise of the conductor to be easily and correctly positioned for cooperation with a support. They also permit expansion and contraction of the bar.

Figure 3:
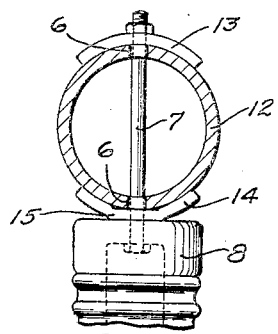
Fig. 3 is a view similar to Fig. 1 but showing a conductor of different cross section.
Figure 4:
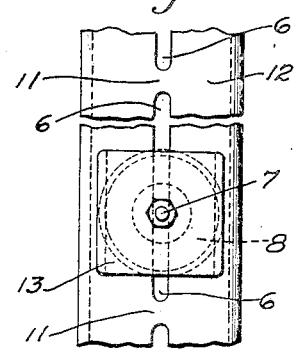
Fig. 4 is a top plan view of a portion of the conductor of Fig. 3.

Referring now to Figs. 3 and 4, the improved conductor is there designated 12 and is shown as a tube substantially cylindrical in transverse section. This cylindrical tube has openings such as the slots 6 in its walls, and these slots are arranged in diametrically opposite wall portions of the tube and extend longitudinally of the latter. At their ends the adjacent slots are separated by the solid wall portions 11 whereby the slots are not continuous from end to end of the tube although it will be understood that the slots are repeated at intervals for the length of the tube. The dimensions of the slot may be in the nature of those suggested for the conductor 5 although this, of course, may be varied as indicated.

Tubular conductor 12 may also be mounted by various means. It is shown as secured to insulator 8 by bolts 7 and to this end curved bracket members 13 and 14 are placed against the upper and lower sides respectively of the conductor, and bolt 7 passes through the support 8, the brackets 13 and 14 and the conductor 12 and serves to clamp the brackets to the conductor and secure the assembly to the support. In order that the conductor may be solidly supported it is preferred that the lower or bottom bracket 14 have a downwardly offset or flattened portion 15 to engage the support 8, it being understood that the remaining portions of bracket 14 and the bracket 13 are so curved or so shaped as to engage the outer surface portions of the conductor or tube in such manner that the latter may be firmly clamped between them or more or less loosely as desired.

Figure 5:
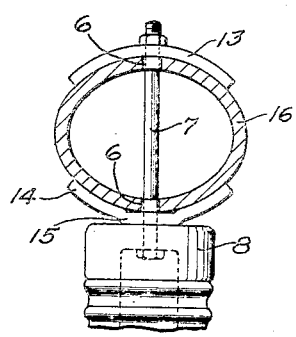
Fig. 5 is a view similar to Fig. 1 but showing a conductor of yet another cross sectional configuration.
Figure 6:
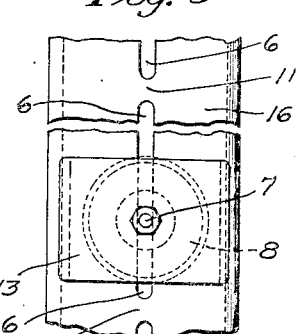
Fig. 6 is a top plan view of a portion of the conductor of Fig. 5.

Figs. 5 and 6 show an arrangement very similar to that of Figs. 3 and 4, the difference residing in that the conductor 16 of Figs. 5 and 6 is elliptical in transverse section. The conductor 16 is provided in its diametrically opposite wall portions, preferably in its flattened wall portions with openings such as the slots 6 spaced by the portions 11, and the bolt 7 passes through such slots and clamps the conductor to the support 8 and between the brackets 13 and 14, which are curved to embrace the conductor. With this arrangement air is free to circulate through the conductor as before explained so that the conductor is ventilated and is capable of carrying heavy currents.

Figure 7:
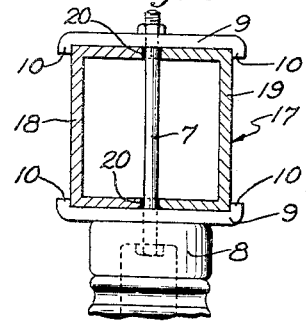
Fig. 7 is a transverse sectional view taken substantially along the line 7—7 of Fig. 8 and showing another modification.
Figure 8:
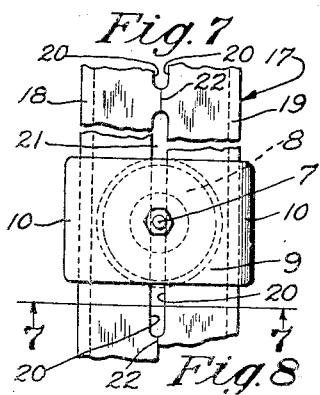
Fig. 8 is a top plan view of a portion of the conductor of Fig. 7.

Figs. 7 and 8 disclose a conductor rectangular in transverse section generally designated 17 and comprising a pair of channel like members 18 and 19. In their edges these members are provided with spaced elongated notches 20 and such notches are so formed that when the members are arranged with the edges of one against the edges of the other, slots 21, corresponding substantially in all particulars with the slots 6 above referred to, are formed. That is, the unnotched portions of the edges of the members abut as at 22 so as to separate the slots 21 from one another as the slots 6 are separated from one another by the solid portions 11. Thus this bus bar instead of being made in one piece as in Figs. 1 and 2 is made in two sections.

The registering of the notches 20 in the edge portions of the channel members 18 and 19 provide slots in the middle of both the upper and lower walls of the conductor 17, and the slots in the upper wall of such conductor register may or may not align with the slots in the lower wall thereof to provide for the circulation of air to ventilate the conductor and also to receive the bolt 7. Said bolt clamps the bracket 9 against the upper and lower sides of the conductor and the inturned or overhanging lip portions 10 of the said brackets engage the side walls of the conductor and hold the members 18 and 19 thereof against lateral movement or movement away from one another to retain them in their proper relationship and with their unnotched edge portions in abutting relationship at 22. This construction permits forming the bar in two sections which are simpler to make than the single tubular section of Figs. 1 and 2.

Figure 9:
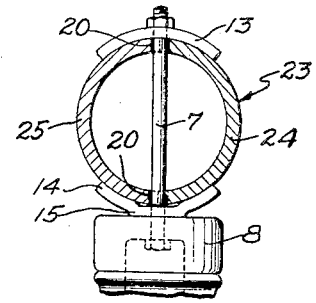
Fig. 9 is a transverse sectional view taken substantially along the line 9—9 of Fig. 10 and showing yet another modification.
Figure 10:
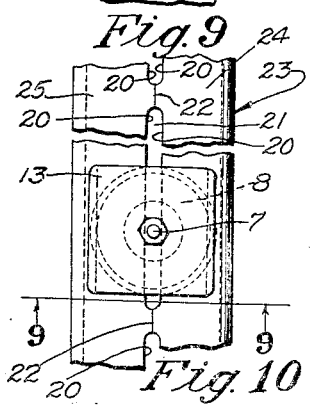
Fig. 10 is a top plan view of a portion of the conductor of Fig. 9.

Figs. 9 and 10 show an arrangement quite similar to that of Figs. 3 and 4 although in Figs. 9 and 10 the conductor 23 while cylindrical in transverse section is made up of a pair of similar members 24 and 25 each provided with the elongated notches 20 in both of its free edges. The notches 20 in each edge of each member are spaced apart and the arrangement is such that when the members have their unnotched portions in abutting engagement at 22, the notched portions of one registered with the notched portions of the other to provide the openings or slots 21, and such slots are arranged in the upper and lower or in diametrically opposite walls of the conductor providing for ventilation and for the passage of the securing bolt 7. This bolt secures the conductor on the support 8 and also clamps the brackets 13 and 14 against the outer wall portions of the conductor. As these brackets are curved as indicated in the drawings they serve to prevent lateral movement of the members 24 and 25 of the conductor from one another and therefore hold them in their proper relative relation with their unnotched edge portions in engagement at 22.

Figure 11:
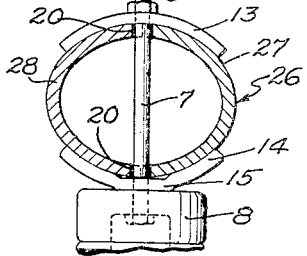
Fig. 11 is a transverse sectional view taken substantially along the line 11—11 of Fig. 12 and showing a further modification.
Figure 12:
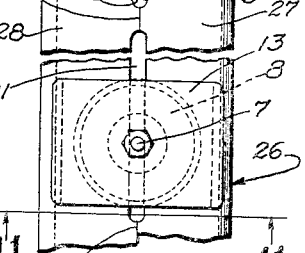
Fig. 12 is a top plan view of a portion of the conductor of Fig. 11.

In Figs. 11 and 12 is shown a conductor 26 elliptical in transverse section but otherwise the same as the conductor 23 of Figs. 9 and 10. The brackets 13 and 14 in Figs. 10 and 11 are of a slightly modified shape whereby they will properly embrace sections 27 and 28 of the conductor 26 and prevent them from moving away from one another or laterally with respect to one another and maintain them with their unnotched edge portions in abutting relation at 22.

Figure 13:
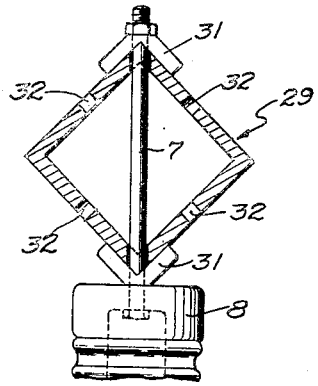
Fig. 13 is a transverse sectional view taken substantially along the line 13—13 of Fig. 14 and showing another modification.
Figure 14:
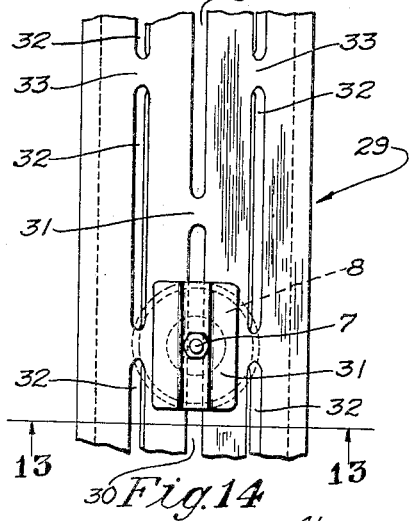
Fig. 14 is a top plan view of a portion of the conductor of Fig. 13.

Figs. 13 and 14 disclose a conductor generally designated 29 and comprising an integral tubular body rectangular in transverse section arranged to be supported on or with one of its corner portions lowermost. That is, in Figs. 13 and 14 the rectangular conductor is turned through an angle of 45° with relation to the position occupied by it in Fig. 1. Conductor 29 is formed solid or in a single piece and is provided with openings, in the present case slots 30 in its upper and lower corner portions. Brackets 31 straddle such corner portions or receive such corner portions of the conductor and the bolt 7 passing through such brackets secures the conductor to the insulator 8 or any other suitable support. The slots 30 may correspond with the slots 6 previously referred to and such slots 30 may each be of any definite or desired length. The adjacent end portions of the slots are separated by solid portions 31 of the bar or conductor whereby the slots are not continuous from end to end of a conductor although at spaced intervals the slots are repeated for the length of the conductor.

Slots 30 provide for the circulation of air through the conductor as will be understood. To facilitate the circulation of air through the conductor and thus increase its current carrying capacity by ventilating it and preventing it from heating up so readily slots or openings 32 may also be provided in each of the inclined walls of the conductor. As shown slots 32 extend longitudinally of the conductor and the slots in each wall thereof are separated at their ends by solid wall portions 33 whereby to prevent separating of the conductor into a number of parts. It will be apparent that the slots 30 and 32 will greatly facilitate the ventilation or cooling of the conductor by the circulation of air therethrough and that the current carrying capacity of the conductor will accordingly be greatly increased over a structure wherein the conductor comprises the same amount of material but is not ventilated.

Figure 15:
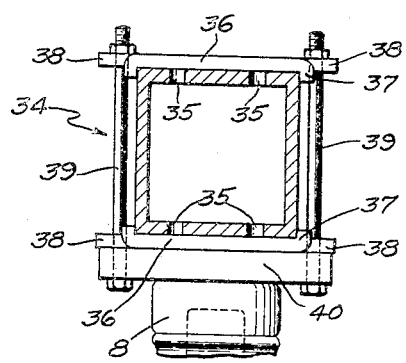
Fig. 15 is a transverse sectional view taken substantially along the line 15—15 of Fig. 16 and showing a still further modification.
Figure 16:
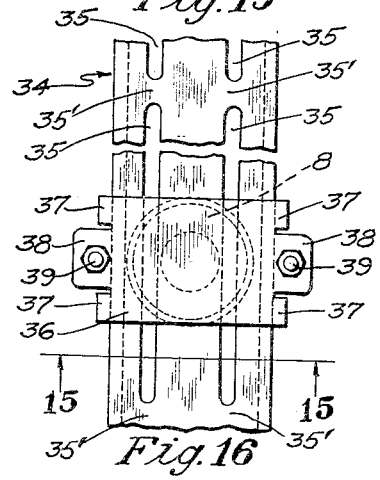
Fig. 16 is a top plan view of a portion of the conductor of Fig. 15.

Figs. 15 and 16 disclose a conductor 34 also rectangular in transverse section but this conductor is arranged on one of its flat sides, and while comprising a length of one piece tubing is in each of its upper and lower walls provided with a plurality of rows of openings, in the present instance two rows of slots 35. It will be noted that each of the upper rows of slots may be arranged in alignment with a row of slots in the lower wall although not necessarily so, and it will further be noted that in each wall the respective rows of slots may be arranged at opposite sides of the middle or longitudinal center line of the wall. In order that the conductor will remain a solid or one piece arrangement the slots constituting a row are separated from one another by solid portions 35' of the conductor, such solid portions being arranged between adjacent ends of the slots of the respective rows.

It will be apparent air may enter and exit through the various slots 35 whereby the conductor 34 will be fully ventilated. A simple and effective means is shown to mount this conductor on an insulator 8, comprising brackets 36 disposed against the upper and lower walls of the conductor, and each bracket has its end portions slit and then has the edge portions of such end portions inturned providing lugs 37 embracing the side walls of the conductor. The central portions of such end portions constitute ears 38 through which are passed bolts 39 clamping the brackets to the conductor and to a cross member 40 which may be attached to or formed with the insulator 8 as desired. In this way it will be apparent that the conductor will be securely held against lateral movement.

Figures 17, 18, 19:
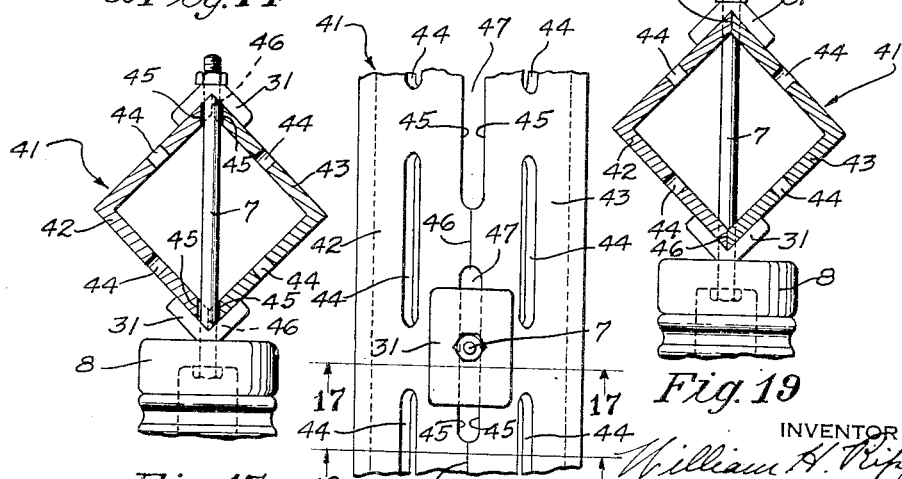
Fig. 17 is a transverse sectional view showing yet another form of conductor constructed according to present invention.
Fig. 18 is a top plan view of a portion of the conductor of Fig. 17.
Fig. 19 is a section substantially on line 19—19 of Fig. 18.

Figs. 17, 18 and 19 disclose a bus bar or conductor 41 quite similar to that of Figs. 13 and 14 but constructed of a pair of sections or angle members 42 and 43. In their flanges the members 42 and 43 are provided with openings such as slots 44 and in each of their edges the said members are provided with spaced notches 45. The edge portions between such notches abut as at 46 when the members or sections are assembled to provide the conductor 41 with the result that the notches 45 form slots 47 in the upper and lower corners of the conductor. This permits rolling or otherwise forming the angle members separately instead of drawing the bar in one piece as in Figs. 13 and 14, but when assembled the bar is very effective as a conductor and has great rigidity and strength.

A bolt 7 may be passed through the upper and lower corner slots 47 of the assembled conductor 41, and straddling the upper and lower corner portions or receiving such corner portions of the conductor are brackets 31 through which the bolt also passes. As the bolt is tightened the brackets are drawn against the sections 42 and 43 securing them against relative lateral movement and with their unnotched edge portions 46 in abutting relationship. With this arrangement the slots 44 in the side walls of the conductor correspond with the slots 32 of Fig. 13 and slots 47 in the upper and lower corners of the conductor 41 correspond with slots 30 of the conductor 29. The abutting edge portions 46 keep the edges 45 of the notches properly separated so they cannot close up to prevent the air circulation. From this it will be apparent that conductor 41 will be thoroughly ventilated by the circulation of air therethrough and that it is therefore capable of carrying heavier currents than could be carried by a conductor comprising the same amount of metal but which is not ventilated.

Figure 20:
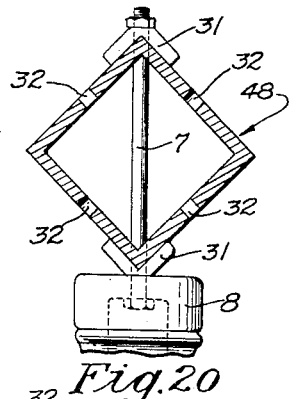
Fig. 20 is a transverse sectional view taken substantially along the line 20—20 of Fig. 18 and showing a further modification.
Figure 21:
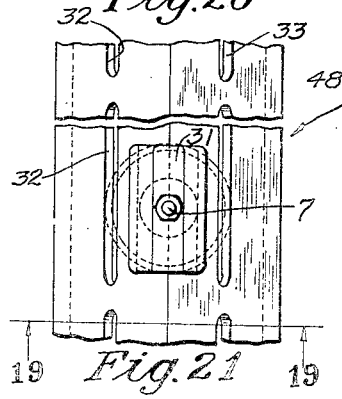
Fig. 21 is a top plan view of a portion of the conductor of Fig. 20.

Figs. 20 and 21 illustrate a conductor 48 corresponding with the conductor 29 of Fig. 13 with the exception that conductor 48 is not slotted in its upper and lower corners but is provided with a relatively small circular opening of a diameter to accommodate the bolt 7 passed through the conductor and brackets 31 and secured to the insulator or support 8. Conductor 48 is solid or of one piece and in its side walls is provided with the ventilating slots 32 as and for the purpose described when considering the conductor 29 of Fig. 13.

Figure 22:
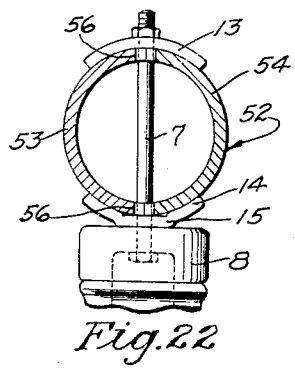
Fig. 22 is a transverse sectional view taken substantially along the line 22—22 of Fig. 23 and showing another slight modification.
Figure 23:
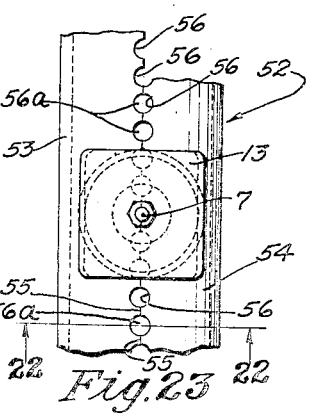
Fig. 23 is a top plan view showing a portion of the conductor of Fig. 22.

Figs. 22 and 23 illustrate a conductor or bus bar generally designated 52 and comprising a pair of similar semi-cylindrical members 53 and 54 arranged with their edges in engagement whereby the assembled conductor is cylindrical. To provide for the ventilation of this conductor each of the free edges of each of the members 53 and 54 is provided with a series of spaced semi-circular notches 56, and when the members are assembled with their unnotched edge portions in abutment as at 55 such notches provide small circular holes 56a in the upper and lower walls of the conductor.

The arrangement is preferably such that the holes 56a in the upper wall of the conductor align with the holes in the lower wall thereof and bolt 7 is passed through a pair of these registering holes to secure the conductor to the insulator 8 or other suitable support. Disposed against the upper and lower sides of the conductor are the brackets 13 and 14 and such brackets provide means for securely clamping the conductor in place and also secure the conductor sections 53 and 54 against casual lateral relative movement and maintain them with their portions 55 in abutting engagement. If preferred, special openings may be provided for the passage of bolt 7.

Figure 24:
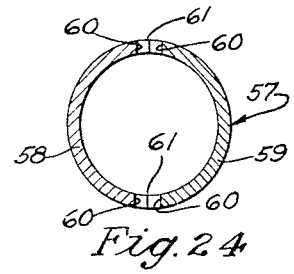
Fig. 24 is a sectional view taken substantially along the line 24—24 of Fig. 25.
Figure 25:
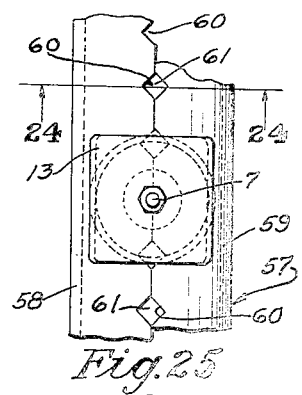
Fig. 25 is a top plan view of a portion of the conductor of Fig. 24 and illustrating the formation of the ventilating openings or perforations therein.

Figs. 24 and 25 illustrate a slight modification of the arrangement of Figs. 22 and 23 and show a cylindrical conductor 57 comprising similar semi-cylindrical sections 58 and 59. Each of these sections is in its free edges provided with spaced V-shape notches 60 and when the sections are assembled the notches of an edge of one section cooperate with those of an edge of the other section to provide diamond shaped holes 61. The sections are held together by brackets, as the brackets 13 and 14, and the bolt 7 may pass through a pair of the holes 61 or through special holes as desired. As in the case of the hole 56a of Figs. 22 and 23 the holes 61 provide for ventilation of the bus bar by the circulation of air through such holes.

Figure 26:
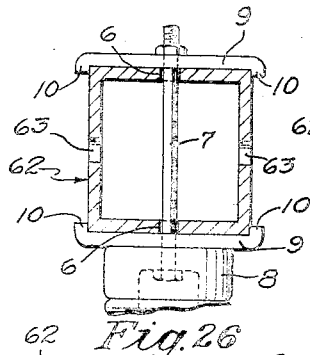
Fig. 26 is a transverse sectional view taken substantially along the line 26—26 of Fig. 27.
Figure 27:
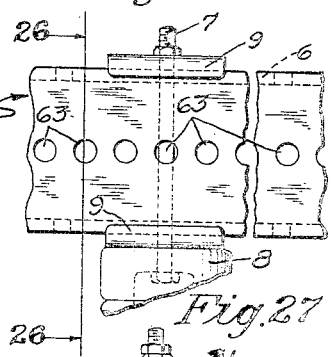
Fig. 27 is a side elevational view showing a further modification of the improved conductor.
Figure 28:
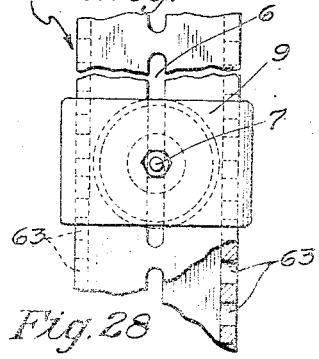
Fig. 28 is a top plan view of a portion of the conductor of Fig. 27.

Figs. 26, 27 and 28 show an arrangement somewhat similar to that of Figs. 1 and 2. In Figs. 26, 27 and 28 the conductor is generally designated 62 and comprises a one piece tubular body, rectangular in transverse section and clamped between the brackets 9 and to the insulator 8 by the bolt 7. Conductor 62 has the elongated slots 6 in the middle or longitudinal center line of its upper and lower walls to provide for ventilation and to receive the bolt 7.

Also, conductor 62 has other openings or slots in its side walls. In the present case they are shown as circular perforations or holes 63 in its side walls, such perforations being spaced and arranged for the circulation of air through the bus bar. Since the slots 6 are separated by the solid conductor portions 11 and the openings 63 spaced apart it will be clear that the conductor will not be in sections. Also, the slots and holes provide for the free circulation of air through the bus bar.

Figure 29:
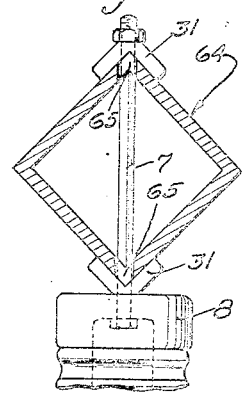
Fig. 29 is a transverse sectional view showing another slightly modified construction.

Fig. 29 illustrates a conductor 64 constructed somewhat the same as the conductor 48 of Figs. 19 and 20 with the exception that the slots 32 are omitted and that a series of holes, corresponding with the holes 56a of Fig. 23, are formed in its upper and lower corners. However, conductor 64 is a one piece tubular member rectangular in cross section and a pair of its holes 65 accommodate the bolt 7 which with the brackets 31 secures the tubular body to the insulator 8.

Figure 30:
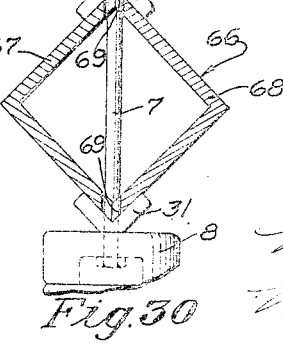
Fig. 30 is a similar view showing a further modification.

Fig. 30 shows a modification of the conductor of Fig. 29 and the conductor of Fig. 30, which is designated 66 and includes a pair of angle members or sections 67 and 68 and which sections have notches in the edge portions to provide spaced opening 69 in the upper and lower corners of the conductor when the sections are assembled. These holes 69 provide for ventilation of the conductor and a pair of them may accommodate the bolt 7 which secures the brackets 31 in position holding the sections 67 and 68 in assembled relation and clamp the assembly to the insulator 8.

From the foregoing it will be clear that each one piece or assembled conductor is provided with holes or perforations in its opposite upper and lower portions and that such holes or perforations may take the form of slots or of round or other shaped holes, elongated slots running longitudinally of the bar being preferred as they provide maximum circulation of air with minimum reduction of conductive cross section of the bar. Further, it will be understood that the holes or perforations may be formed in any suitable manner and may be cut, punched or the like.

While the holes may be in the form of perforations as in Figs. 1 through 6; 13 through 16; 20 and 21; 26 through 28 and 29; they may also result from the matching or registering of notches when the conductor is assembled as in the other figures where the conductor is an assembled device. In either case the holes are in opposite portions or opposite wall portions of the conductor, preferably the upper and lower portions, and provide for the circulation of air through the conductor whereby to ventilate and cool the same, and render it capable of carrying heavier currents than could be carried by a conductor comprising the same amount of metal but not ventilated. While it is preferred that the conductors be manufactured of copper or copper alloy it will be understood that the invention is not limited to a conductor of such metal.

It will also be seen that in the forms of Figs. 2 to 12, 17 to 19, 22 to 25 and 30 the individual sections are generally trough shaped and when assembled with their edges together they form a tubular bus bar. It is not, however, necessary in these forms that the notches in the free edges of the sections be in alignment, as the notches may be in the edges of one section only leaving the other section with straight unnotched edges, or the notches of either section may be out of alignment with those of the other section so long as the ventilating openings in the walls of the completed bus bar are provided.

With this conductor high electrical characteristics are secured, and particularly the so called skin effect with alternating currents is greatly reduced. It has high strength and rigidity coupled with high electrical conductivity and low resistance to flow of direct and alternating currents. In view of the thorough ventilation of the inside as well as the outside of the conductor heat is quickly dissipated preventing overheating of the conductors and permitting the use of less metal for a given current capacity. This cooling effect is increased by the increase in radiating surface. The conductor therefore has maximum current carrying capacity per unit of cross sectional area, for the distribution of the metal is such that extremely high current densities are permitted with minimum temperature rise.

It is more particularly intended for carrying large alternating currents as the so called skin effect is greatly reduced over that of a solid conductor, but because of the ventilating characteristics and its strength and rigidity it is also very desirable for direct currents.

The square or rectangular constructions provide flat surfaces greatly facilitating the making of bolted connections of high electrical conductivity for take off and supply leads.

Having thus set forth the nature of my invention, what I claim is:

1. A bus bar comprising a tubular body including a pair of similar generally trough shaped sections each having spaced notches opening through each of its edges, and means securing said sections together with the notches of one section in registry with those of the other sections whereby said conductor has ventilating holes in its opposite portions.

2. A bus bar comprising a tubular body including a pair of similar sections each having elongated notches opening through each of its edges separated by integral wall portions of the section, and means securing said sections together with the elongated notches of one section in registry with those of the other sections whereby said conductor has ventilating slots in its opposite portions.

3. A bus bar comprising a tubular body including a pair of similar generally trough shaped sections arranged with their free edges abutting, and with a free edge at the upper and lower portion of the bar provided with notches forming ventilating openings in the bar of sufficient size to permit circulation of air through the bar to cool it.

4. A bus bar comprising a tubular body including a pair of similar angle sections each having notches opening through each of its edges, and means securing said sections with their free edges together and with the notches of one section in registry with those of the other section whereby said conductor has ventilating openings in opposite corner portions.

5. A bus bar for an electric circuit comprising a horizontal tubular body having a row of spaced, elongated ventilating slots in its upper and lower wall portions of sufficient size to permit free circulation of air through the bar to cool it, the slots running longitudinally of the bar and being separated at their ends by spacing means integral with and forming a part of the walls of the body whereby is secured maximum circulation of air and cooling of the bar with minimum reduction of conductive cross section of the bar.

6. A bus bar for an electric circuit comprising a horizontal tubular body having elongated ventilating slots in its upper and lower wall portions of sufficient size to permit circulation of air through the bar to cool it, said slots being separated by spacing means integral with and forming a part of the walls of the body and extending longitudinally thereof whereby is secured maximum circulation of air and cooling effect without material reduction of conductive cross section of the bar, and certain of said slots arranged to register for at least a portion of their lengths to accommodate a securing bolt.

7. A bus bar for an electric circuit comprising a tubular body rectangular in transverse section, means supporting said body on one only of its corner portions with a diagonal in an upright position, and said body having a ventilating slot in each of its wall portions, said slots being of a size to permit free circulation of air through the bar to cool it, and said slots extending longitudinally of the bar and separated by integral portions of said walls whereby is secured maximum ventilation of the bar without material reduction of conductive cross section of the bar.

8. A bus bar for an electric circuit comprising a tubular body rectangular in cross section having a plurality of spaced elongated ventilating openings in its upper and lower wall portions of a size to permit free circulation of air through the bar to cool it, said openings extending longitudinally of the body and separated at their ends by integral wall portions of the body whereby is secured maximum circulation of air and cooling of the bar without material reduction in conductive cross section of the bar.

9. A bus bar for an electric circuit comprising a tubular body rectangular in transverse section, means supporting said body on one only of its corner portions, and said body having elongated ventilating openings through each of a pair of its opposite corner portions of a size to permit free circulation of air through the bar to cool it, said openings passing through a corner portion of the body and separated by integral wall portions of the body and extending longitudinally of the bar whereby is secured maximum circulation of air with minimum reduction of conductive cross section of the bar.

WILLIAM H. RIPPERE.